United States Patent [19]

Mielke

[11] 4,158,494
[45] Jun. 19, 1979

[54] ROLL FILM CAMERA FOR RENDERING A BEND IN A FILM HARMLESS

[75] Inventor: Bodo Mielke, Wolfenbüttel, Fed. Rep. of Germany

[73] Assignee: Rollei-Werke Franke & Heidecke, Braunschweig, Fed. Rep. of Germany

[21] Appl. No.: 830,189

[22] Filed: Sep. 2, 1977

[30] Foreign Application Priority Data

Sep. 8, 1976 [DE] Fed. Rep. of Germany ....... 2640308

[51] Int. Cl.² .............................................. G03B 17/00
[52] U.S. Cl. .................................. 354/202; 242/71.2; 354/216; 354/275
[58] Field of Search ........ 354/202, 212, 216, 213–215, 354/151, 275, 71, 65; 242/71.2

[56] References Cited

U.S. PATENT DOCUMENTS

| 2,592,158 | 4/1952 | Kirby et al. ........................ 242/71.2 |
| 2,732,754 | 1/1956 | Foster ................................ 354/212 X |
| 3,183,811 | 5/1965 | Elliott et al. ..................... 242/71.2 X |

FOREIGN PATENT DOCUMENTS

Z 4696 10/1956 Fed. Rep. of Germany .......... 354/212

*Primary Examiner*—John Gonzales
*Attorney, Agent, or Firm*—Ernest F. Marmorek

[57] ABSTRACT

In a roll film camera defining a film track, and having a film-advance distance, provision is made for any bend in the film due to the rerouting thereof over a film rerouting roll, to be rendered harmless by disposing the film rerouting roll at a predetermined distance along the film track from a film inlet edge of a film gate of the camera; the predetermined distance is about equal to the film-advance distance, plus one half the difference between the spacing of the film inlet and outlet edges of the film gate.

9 Claims, 2 Drawing Figures

ROLL FILM CAMERA FOR RENDERING A BEND IN A FILM HARMLESS

BACKGROUND OF THE INVENTION

The present invention relates to a roll film camera, particularly a miniature camera with a provision for a cartridge, and film take-up and supply-reels disposed on a side of the film gate remote from the lens, and wherein the film is rerouted between the supply reel and the film gate through an angle exceeding 90°.

An arrangement of the film supply-and take-up reels at the side of the film remote from the lens has the advantage that the reels can be disposed very close to one another, so that the required camera width or length, as defined in the direction of the film track, only exceeds the width or length of the film gate marginally. Furthermore, as a result of the reels being so close to one another, the camera gearing is simplified, and space is saved for driving the reels.

In view of the unusually large angle of rerouting, or bend, of the film there arise problems relating to maintaining the film flat within the film gate, which problems are hardly present in a conventional roll film camera. In a conventional roll film camera, the film reels are disposed at respective ends of the film gate, and the film is supplied, or taken-up in a direction tangential to the reels, and is not bent when passing from the supply reel to the take-up reel through the film gate. Although the film has a certain tendency to retain any curvature it has assumed in the supply reel, as a result of dwelling in the camera for some time, and drying therein, this tendency of the film to remain curved can be rendered harmless by a suitable film gate guidance, and a pressure plate in the film gate, without causing any serious difficulties.

This task has proved more difficult in roll film cameras, in which the film is supplied from the supply reel or film cartridge and subtends an acute angle, or is disposed almost at right angles with respect to the film inlet edge of the film gate, a practice which is customary in reflex cameras having two lenses. Here it is possible for the film to become pronouncedly curved when remaining in the camera between two shots or pictures, the center of the curvature or bend then passing during the next film advance to the image field or frame, thus giving rise to an improperly focused zone in the next picture or shot taken, if such a curvature or bend can no longer be compensated by the film guidance means and the film pressure plate, and if this defect cannot be remedied by a tight guidance of the film between, for example, a plate of flat glass or transparent material, and a pressure plate, or by the film guidance means having a curvature so as to make the formation of a bend and harmless as possible from the very start.

SUMMARY OF THE INVENTION

It is therefore one of the principal objects of the present invention to provide an additional rerouting roll in the vicinity of the supply roll, and although not taking any measures to prevent the formation of the curved film at the rerouting location, to set the distance between the additional rerouting roll and the film inlet edge of the film gate so that the film length, or film distance between the center of the rerouting angle of the film of the rerouting roll, and the film inlet edge of the film gate corresonds to the film advance distance plus one half the distance between the film advance distance and the spacing of the film inlet and outlet edges of the film gate. The film width in miniature cameras is usually defined by the distance of the film inlet edge from the film outlet edge.

Various factors can influence the curvature of the film formed at the rerouting roll: for example, the curvature already assumed by the film, the disposition of the film guidance means, and the like, so that the resulting curvature need not necessarily be symmetrical. In such cases, the previously defined distance of the rerouting roll from the film inlet edge may be slightly exceeded, or may fall short of the normal or required distance, without this being detrimental to the desired objective. In miniature cameras, it is generally sufficient, if the distance of the film gate, as defined along the film track, is equal to the film advance distance.

There is accordingly provided in a roll film camera, particularly a roll film camera adapted for use with a cartridge, in combination, a housing, a film gate disposed in the housing, and which housing has a film inlet edge and a film outlet edge spaced apart from one another at a predetermined spacing, a lens disposed in the housing on one side of the film gate, film reel means disposed on the other side of the film gate for holding and stepwise advancing a film disposed on the film reel means, the film being incrementally advanceable by a film-advance distance, and a film reel rerouting roll disposed at a predetermined distance from the film inlet edge. The film reel means, the film gate, and the film rerouting roll define a film track, and the predetermined distance is defined along the film track, and equals about the film distance, plus one half the difference between the predetermined distance and the predetermined spacing.

The film reel means include first and second film-deflection rolls disposed in the immediate vicinity of the film inlet edge, and in the vicinity of the film outlet edge, respectively, and wherein the first film deflection roll is spaced from the rerouting roll at a distance along the film track, which does not exceed the film-advance distance.

The film is guided within the film track along the first deflection roll and the rerouting roll, defining a first predetermined curvature therebetween, and film guidance means are preferably disposed between the first deflection roll and the rerouting roll, which film guidance means have a second predetermined curvature corresponding to the first predetermined curvature.

The film reel means also include a supply reel and a take-up reel having film outlets and inlets, respectively; the reels are disposed substantially in the same plane and in the vicinity of one another. The first film-deflection roll is preferably spaced from the film gate, the supply reel and the rerouting roll so that the film is rerouted from the outlet of the supply reel to the inlet of the take-up reel through an angle exeeding 90°. In a preferred embodiment, this angle is within a range of a 300° to 420° angle.

The second film-deflection roll is preferably spaced from the film gate and from the take-up reel so that the film is rerouted by the second film-deflection roll through an angle greater than about 270°. The roll film camera preferably includes gate means disposed in a housing for exerting pressure on the film.

Furthermore, in a method for rerouting a film in a film camera adapted for use with a cartridge, and wherein the camera includes a housing, a film gate disposed in the housing which has a film inlet edge and a film outlet edge spaced apart from one another at a predetermined spacing, a lens disposed in the housing on one side of the film gate, film reel means disposed on the other side of the film gate for holding and advancing a film disposed on the film reel means, and a film rerouting roll disposed at a predetermined distance from the film inlet edge, the film reel means, the film gate, and the film rerouting roll defining a film track, the steps comprise: incrementally advancing the film by a film-advance distance, and rerouting the film from the film reel means to the film inlet edge via the film rerouting roll through an angle exceeding 90°, and wherein the predetermined distance is defined along the film track, and equals about the film advance distance plus one half the distance between the predetermined distance and the predetermined spacing.

Furthermore, in a method where the film reel means preferably include a supply reel, and a take-up reel having film outlets and inlets, respectively, and the camera includes first and second film-deflection rolls disposed in the immediate vicinity of the film inlet edge, and in the vicinity of the film outlet edge, respectively, and the first film deflection roll is spaced from the rerouting roll at a distance along the film track not exceeding the film-advancing distance, additional steps include: rerouting the film by the second deflection roll through an angle greater than about 270°, and rerouting the film from the outlet of the supply roll to the inlet of the take-up roll through an angle within the range of about 300° to about 420°.

The film guidance will therefore be particularly suitable for a camera of the aforesaid kind, without sacrificing any of its primary advantages, namely its small length, or width, in the direction of the film advance.

BRIEF DESCRIPTION OF THE DRAWING

For a fuller understanding of the nature and objects of the invention, reference should be had to the following detailed description, taken in conjunction with the accompanying drawing, in which.

DESCRIPTION OF THE PREFERRED EMBODIMENTS

Figure 1:
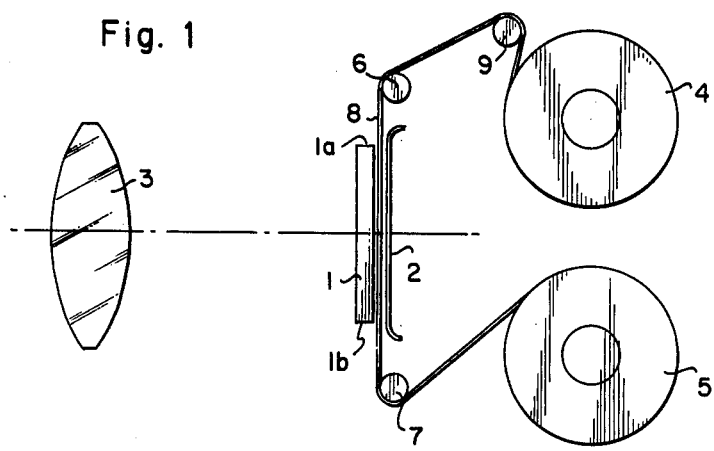
FIG. 1 shows schematically the basic arrangement of the camera.

In carrying the invention into effect, there are illustrated in the figures only parts essential for the invention, namely, a film gate or film guidance means 1, which defines a film inlet edge 1a, and a film outlet edge 1b, along the direction of the film track, a pressure plate 2, a lens 3, and film reel means disposed on a side of the film gate 1 remote from the lens 3, consisting of a supply reel 4, and a take-up spool 5.

In the vicinity of respective ends of the pressure plate 2, there are disposed conventional film-deflection rolls 6 and 7. In this type of cartridge construction, the film 8 normally proceeds from the supply reel 4 via the deflection roll 6, the pressure plate 2, and the deflection roll 7, to the take-up reel 5. The film deflection roll 6 is spaced from the film gate 2, the supply reel 4 and the rerouting roll 9, so that the film is rerouted from the outlet of the supply reel 4 to the inlet of the take-up reel 5 through an angle exceeding 90°; in a preferred embodiment of the invention, this angle has a range of about 300° to about 420°. In the same embodiment, the film deflection roll 7 is spaced from the film gate 2 and from the take-up reel 5, so that the film is rerouted by the film deflection roll 7 through an angle greater than about 270°. This film guidance has been designed so that the photo-sensitive film layer on the film faces the center of the reel, when wound thereon, but faces the lens when transported to the film gate 2.

According to the present invention, there is disposed a rerouting roll 9 in the vicinity of the supply reel 4, so that the film 8 is rerouted by a rerouting roll 7 through an obtuse angle, as has already been described; thus the film deflection roll 6 will reroute the film 8 through a smaller angle than would be the case without the presence of the rerouting rool 9. The rerouting roll 9, which is disposed in the vicinity of the supply reel 4, is disposed at a predetermined distance from the film inlet edge 1a of the film gate 1, as defined along the film track, which corresponds to a film-advance distance, namely the film length which is advanced or transported along the film track, when the film is advanced by one image, or which predetermined distance at most exceeds the film-advance distance by the difference between that film-advance distance and the spacing between the film inlet edge, and the film outlet edge of the film gate.

In a preferred version of the invention, this distance equals the film-advance distance, plus one-half of the previously defined differential distance. By this means, it is insured that during the next film advance, the bend formed in the film 8 by the rerouting roller 9 will be stopped just ahead of the inlet edge 1a of the film gate 2, and that it will be transported through the film gate 1 upon the next film-advance step, until the end of the film gate guidance downstream of the outlet edge 1b. It is furthermore of little importance, whether such a bend is formed by the film dwelling for some time in the camera, or whether the formation of such a bend is prevented due to the continuous taking of images or snaps, because such bends, if they do arise, will remain always outside the film gate, and will therefore not impair focusing of the image on the film 8.

It is preferable if the film deflection roll 6 is disposed as closely as possible to the film inlet edge 1a, so that any deformation or curvature of the film resulting from the film deflection roll 6 approximately coincides with a bend due to the rerouting roller 9, and then occurs outside the film gate 2 during each film advance.

Figure 2:
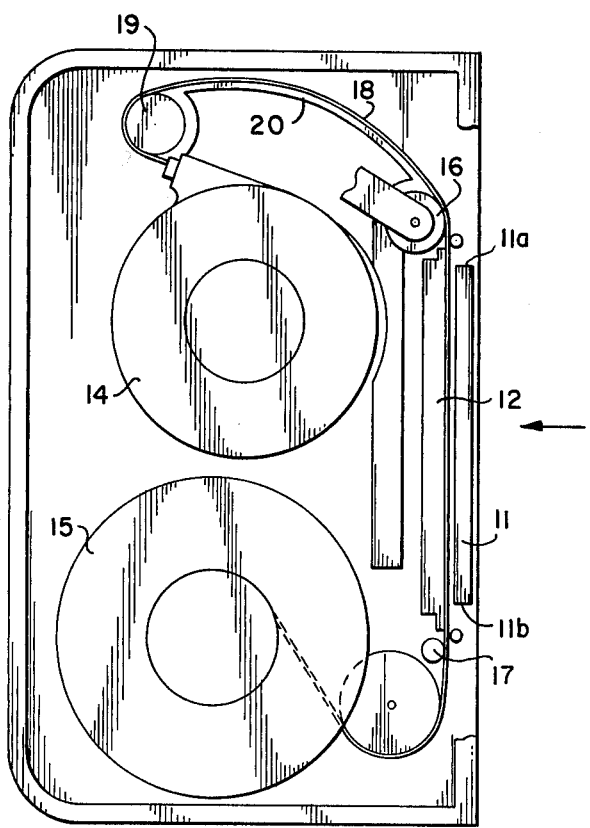
FIG. 2 shows the basic scheme of FIG. 1, supplemented by a curved film guidance.

An alternate version of the invention is shown in FIG. 2. The same numerals have been used for similar parts, except that the number 10 has been added to each previously specified numeral. There is additionally shown a curved guidance track 20 disposed between rolls 16 and 19, so that the film 18 is always abutting the guidance track 20.

Although any bend in the film 18 will only be slightly reduced by the curved guidance track 20, which also applies to the deflection roller 16, it should be pointed out that it is not the objective of the guidance track 20 to reduce any bend of the film, as the deflection roller 16 contributes to such a bend in any case in only a very small manner, but to insure an exact spacing or distance of the roller 19 from the film inlet edge 11a, namely the film advance from the center of the rerouting angle of the roller 19 along the film track, up to the film inlet edge 11a, or up to the deflection roller 16.

Having thus described the invention, what I claim as new, and desire to be secured by Letters Patent, is as follows:

1. A roll film camera, particularly a roll film camera adapted for use with a cartridge, in combination comprising:

a housing, a film gate including a film picture gate, said film gate being disposed in said housing and having a film inlet edge and a film outlet edge spaced apart from one another at a predetermined spacing, a lens disposed in said housing on one side of said film gate, film reel means disposed on the other side of said film gate for holding a film on said film reel means, and for rerouting and stepwise advancing said film through said film gate by an angle exceeding 90°, the film being incrementally advanceable by a film-advance distance, and a film rerouting roll disposed at a predetermined distance from said film inlet edge, the film being contactable by said film rerouting roll, said film reel means, said film gate and said film rerouting roll defining a film track, said predetermined distance being defined along said film track, and equalling about the film-advance distance and one-half the difference between said film-advance distance and said predetermined spacing, whereby any tendency of the film to form a curvature while in contact with said film rerouting roll is rendered harmless by the film curvature coming to rest outside said film picture gate upon the film being advanced by any multiple of said film-advance distance.

2. A roll film camera according to claim 1, wherein the film reel means include first and second film-deflection rolls disposed in the immediate vicinity of said film inlet edge and in the vicinity of said film outlet edge, respectively, said first film deflection roll being spaced from said rerouting roll at a distance along said film track not exceeding the film-advance distance.

3. A roll film camera according to claim 2, wherein the film is guided within the film track along said first deflection roll and said rerouting roll, defining a first predetermined curvature therebetween, and further comprising film guidance means disposed between said first deflection roll and said rerouting roll for imparting a predetermined curvature to the film.

4. A roll film camera according to claim 2, wherein said film reel means include a supply reel and a take-up reel having film outlets and inlets, respectively, said reels being disposed substantially in the same plane, and in the vicinity of one another.

5. A roll film camera according to claim 4, wherein said first film-deflection roll is spaced from said film gate, said supply reel and said rerouting roll so that the film is rerouted by said rerouting roll through an angle exceeding 90°.

6. A roll film camera according to claim 4, wherein said second film-deflection roll is spaced from said film gate and from said take-up reel so that the film is rerouted by said second film-deflection roll through an angle having a range between 90° and 180°.

7. A roll film camera according to claim 1, further comprising gate means disposed in said housing for exerting pressure on the film.

8. In a method for rerouting a film in a roll film camera adapted for use with a cartridge, the camera including a housing, a film gate disposed in the housing and having a film inlet edge and a film outlet edge spaced apart from one another at a predetermined spacing, a lens disposed in the housing on one side of the film gate, film reel means disposed on the other side of the film gate for holding and advancing a film disposed on the film reel means, and a film rerouting roll disposed at a predetermined distance from the film inlet edge, the film reel means, the film gate and the film rerouting roll defining a film track, the steps comprising:

advancing the film by a film-advance distance, and rerouting the film from the film reel means to the film inlet edge via the film rerouting roll through an angle exceeding 90°, the predetermined distance being defined along the film track, and equalling about the film-advance distance, and one-half the difference between the predetermined distance and the film advance spacing.

9. In a method according to claim 8, wherein the film reel means include a supply reel and a take-up reel having film outlets and inlets, respectively, and the camera includes first and second film-deflection rolls disposed in the immediate vicinity of the film inlet edge and in the vicinity of the film outlet edge, respectively, and the first film deflection roll is spaced from the rerouting roll at a distance along the film track not exceeding the film-advance distance, further comprising the steps of:

rerouting the film by the second deflection roll through an angle having a range between 90° and 180°.

* * * * *